(12) United States Patent
Jawanda

(10) Patent No.: US 6,243,581 B1
(45) Date of Patent: Jun. 5, 2001

(54) METHOD AND SYSTEM FOR SEAMLESS ROAMING BETWEEN WIRELESS COMMUNICATION NETWORKS WITH A MOBILE TERMINAL

(75) Inventor: Jastinder Jawanda, Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/209,581

(22) Filed: Dec. 11, 1998

(51) Int. Cl.[7] .................. H04Q 7/20; H04Q 7/24; H04L 12/28; H04L 12/56

(52) U.S. Cl. .................. 455/432; 455/437; 455/557; 370/338; 370/401; 370/913

(58) Field of Search ..................... 455/466, 426, 455/432, 436, 442, 550, 556, 557, 437, 440, 11.1; 370/315, 323, 331, 332, 338, 349, 401, 913

(56) References Cited

U.S. PATENT DOCUMENTS

| | | | |
|---|---|---|---|
| 5,457,680 | * | 10/1995 | Kamm et al. .................. 455/432 X |
| 5,600,707 | * | 2/1997 | Miller, II .................. 455/434 |
| 5,790,952 | * | 8/1998 | Seazholtz et al. .................. 455/432 |
| 5,796,727 | * | 8/1998 | Harrison et al. .................. 370/338 |
| 5,878,343 | * | 3/1999 | Robert et al. .................. 455/424 |
| 5,930,241 | * | 7/1999 | Fried .................. 370/328 |
| 5,961,607 | * | 10/1999 | Schaefers .................. 455/432 X |
| 6,052,589 | * | 4/2000 | Persson et al. .................. 455/433 |

* cited by examiner

*Primary Examiner*—Tracy Legree
(74) *Attorney, Agent, or Firm*—Bruce E. Garlick; James A. Harrison

(57) ABSTRACT

A mobile computer system capable of seamless roaming between wireless communication networks includes data processing resources for executing software, a plurality of wireless interfaces that supports simultaneous wireless connections with first and second wireless communication networks, and a network access arbitrator that routes data communicated between the software executed by the data processing resources and the first and second wireless communication networks. To permit seamless roaming, the network access arbitrator routes the data to the first wireless communication network via a first wireless interface and then seamlessly reroutes the data to a second wireless communication network via a second wireless interface. According to one embodiment, the network access arbitrator reroutes the data in response to the data bandwidths of the connections with the first and second wireless communication networks.

11 Claims, 4 Drawing Sheets

METHOD AND SYSTEM FOR SEAMLESS ROAMING BETWEEN WIRELESS COMMUNICATION NETWORKS WITH A MOBILE TERMINAL

BACKGROUND OF THE INVENTION

1. Technical Field

The present invention relates in general to data communication and in particular to a method and system for wireless data communication. Still more particularly, the present invention relates to a method and system for seamless roaming between wireless data communication networks with a mobile terminal.

2. Description of the Related Art

Connectivity to wired networks continues to experience exponential growth. Likewise, recent years have seen rapid growth in the market for portable electronic devices, including portable computers and mobile telephones. It is expected in view of the growing use of portable electronic devices and the pervasive use of wired networks for entertainment, communication, and commerce that there will soon be a large demand for wireless data access to wired networks such as intranets and the Internet and World Wide Web.

Already, some standards have emerged for wireless data communication. For example, an overlay technology called CDPD (Cellular Digital Packet Data) assigns channels of an underlying radio telephony system, for example, an AMPS (Advanced Mobile Phone Service) or TDMA (Time Division Multiple Access) system, for wireless data communication. In this manner, a user of a portable electronic device (e.g., a portable computer) can establish wireless data access to the local wireless data network, which is in turn connected by a landline to the target wired network (e.g., the Internet). Another technology called GPRS (General Packet Radio Service) is integrated into the GSM (Global System for Mobile communications) protocol in order to provide wireless data access.

While the mobility of portable computer users is greatly enhanced by the availability of wireless data communication, the mobility of a portable computer is currently restricted when the user has an active session. That is, the user cannot move out of the service area of the wireless data communication network through which the user is connected to the target network without terminating the session. Thus, if the portable computer user has initiated a time consuming operation such as a download of a large file, the heretofore mobile user must remain within a confined service area if the operation is to complete successfully.

As should thus be apparent, it would be desirable to provide a method and system for data communication that permit a portable computer user to move outside the service area of a wireless data communication network through which a connection to a computer network is established without terminating an active session.

SUMMARY OF THE INVENTION

In accordance with the present invention, a mobile computer system capable of seamless roaming between wireless communication networks includes data processing resources for executing software, a plurality of wireless interfaces that supports simultaneous wireless connections with first and second wireless communication networks, and a network access arbitrator that routes data communicated between the software executed by the data processing resources and the first and second wireless communication networks. To permit seamless roaming, the network access arbitrator routes the data to the first wireless communication network via a first wireless interface and then seamlessly reroutes the data to a second wireless communication network via a second wireless interface. According to one embodiment, the network access arbitrator reroutes the data in response to the data bandwidths of the connections with the first and second wireless communication networks.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
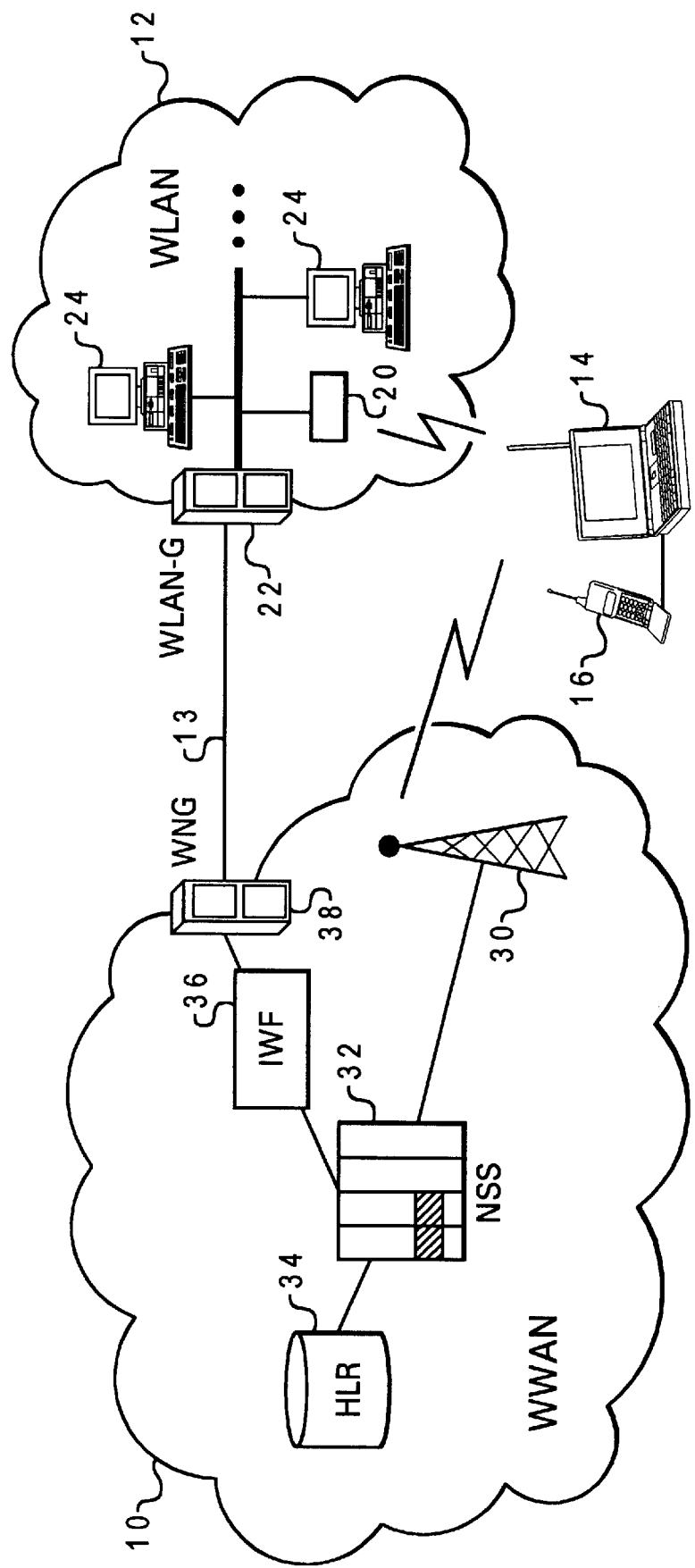
FIG. 1 depicts an illustrative embodiment of a wireless data communication environment in accordance with the present invention.

With reference now to the figures and in particular with reference to FIG. 1, there is depicted an illustrative embodiment of a wireless data communication environment in which the present invention may advantageously be employed. The wireless data communication environment shown in FIG. 1 includes a wireless wide area network (WWAN) 10 and a wireless local area network (WLAN) 12 coupled by an external network 13, which may comprise, for example, the Internet or a public switched telephone network (PSTN).

WLAN 12, which may form, for example, the intranet of a business, has at least one wireless network adapter 20, a wireless LAN gateway (WLAN-G) 22, and one or more fixed terminals 24 that are all interconnected by a conventional (e.g., Ethernet) network. Wireless LAN gateway 22 forms the demarcation point of WLAN 12 and performs all necessary protocol conversions so that entities within WLAN 12 can communicate with entities coupled to external network 13. As discussed further herein below, datagrams are preferably communicated between WWAN 10 and WLAN 12 across external network 13 utilizing the mobile internet protocol (IP) described in detail in Perkins, C., "IP Mobility Standard," RFC 2002, October 1996 available from the Internet Engineering Task Force (IETF) and incorporated herein by reference. Wireless network adapter 20 is in all respects like the conventional network adapter cards utilized to interface fixed terminals 24 to WLAN 12, except that one or more mobile terminals 14 can obtain a high bandwidth wireless connection to WLAN 12 via wireless network adapter 20.

As further illustrated in FIG. 1, WWAN 10 is a cellular communication system that can be utilized for both voice and data communication. For example, WWAN 10 includes a base station 30, which transmits wireless signals to and receives wireless signals from one or more mobile phones 16. For data connections, such wireless signals can be transmitted according to any currently available or future wireless data protocol such as code division multiple access (CDMA), CDPD, or GPRS. Base station 30 is further coupled to a network subsystem (NSS) 32, which in the illustrative embodiment is implemented as a single computer system that executes software performing the conventional functions of a base transceiver station (BTS), a base station controller (BSC), and a mobile switching center (MSC). NSS 32 is in turn coupled to home location register 34, which is a database storing information related to the voice connection services provided to mobile phones 16 having WWAN 10 as their home communication network. In addition, NSS 32 is coupled by interworking function (IWF) 36 to a wireless network gateway (WNG) 38 that connects WWAN 10 to external network 13. IWF 36 contains a database storing information related to the data connection services that WWAN 10 will provide to mobile phones 16 having WWAN 10 as their home communication network. WNG 38 performs both routing and protocol conversion functions for datagrams transmitted between external network 13 and WWAN 10.

Figure 2:
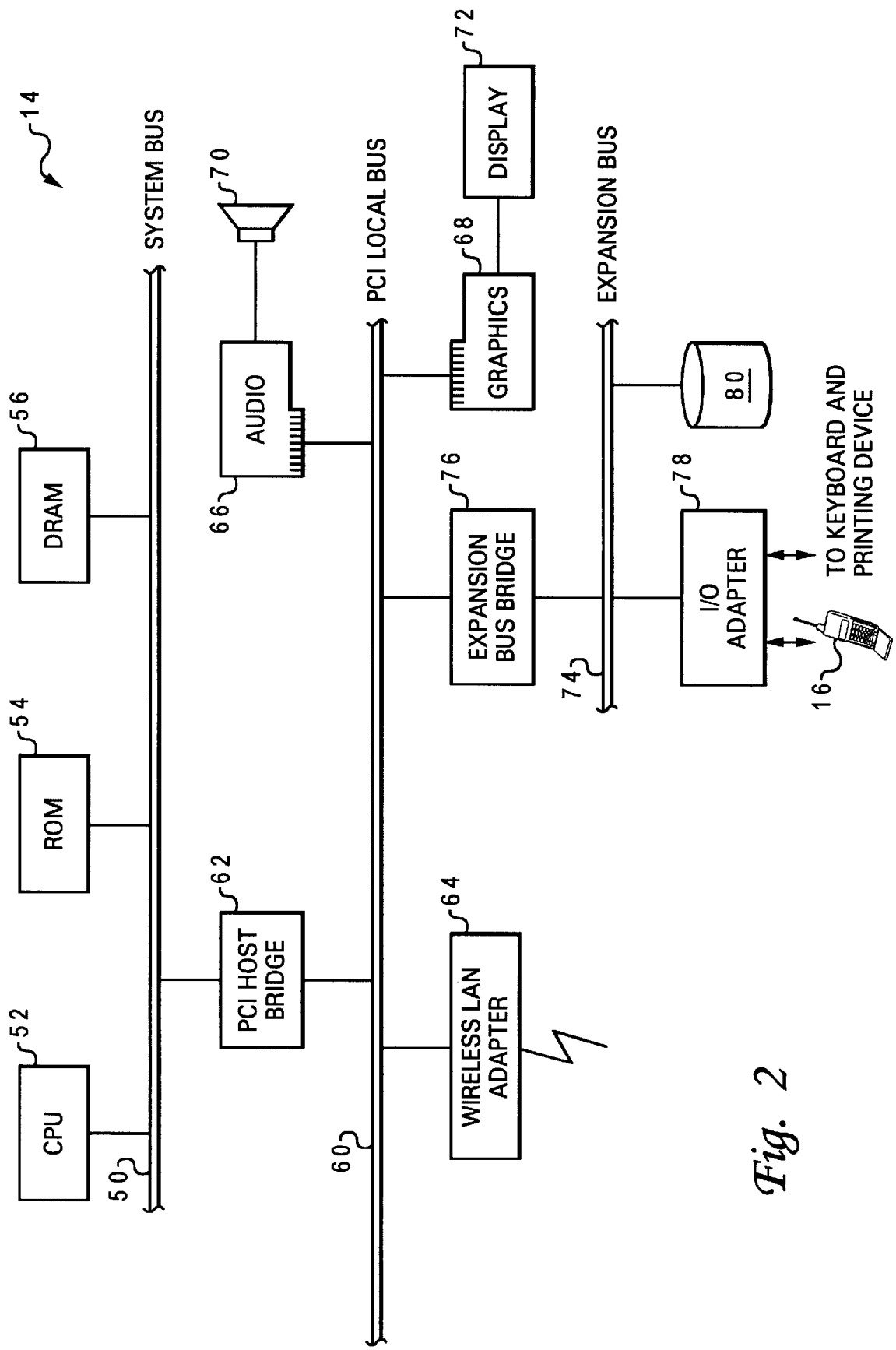
FIG. 2 is a more detailed block diagram of the mobile terminal shown in FIG. 1.

Referring now to FIG. 2, there is illustrated a more detailed block diagram of mobile terminal 14. As shown, mobile terminal 14 has a system bus 50 connected to a central processing unit (CPU) 52, which executes software instructions and controls the operation of mobile terminal 14. A read-only memory (ROM) 54 and dynamic random access memory (DRAM) 56 are also connected to system bus 50 in order to provide storage for data and instructions that may be accessed by CPU 52. System bus 50 is further coupled to PCI local bus 60 via Peripheral Component Interconnect (PCI) host bridge 62. PCI host bridge 62 provides both a low latency path through which CPU 52 may directly access PCI devices mapped to bus memory and/or I/O address spaces and a high bandwidth path through which PCI devices may directly access DRAM 56.

The PCI devices connected to PCI local bus 60 include a wireless LAN adapter 64, which handles network communication between mobile terminal 14 and WLAN 12, and a PCI-compatible audio controller 66 and graphics controller 68, which drive speaker(s) 70 and flat-panel display 72, respectively. PCI bus 60 is further coupled to an expansion bus 74 via expansion bus bridge 76. Coupled to expansion bus 74 is an input/output (I/O) adapter 78, which provides an interface to mobile terminal 14 for both conventional input devices, such as a keyboard and pointing device, and mobile phone 16. The link connecting mobile phone 16 and I/O adapter 78 may be a conventional RS-232 connection, for example. A hard disk 80 for providing non-volatile storage for software and data is also be connected to expansion bus 74. In a preferred embodiment of the present invention, the software stored on hard disk 80 includes operating system, application, and communication software, as discussed below in greater detail with respect to FIG. 3. Of course, in other embodiments of mobile terminal 14, such communication software may be encoded within other computer usable media, including both transmission media (e.g., computer and telephone networks) and storage media (e.g., floppy disks and CD-ROMs).

Figure 3:
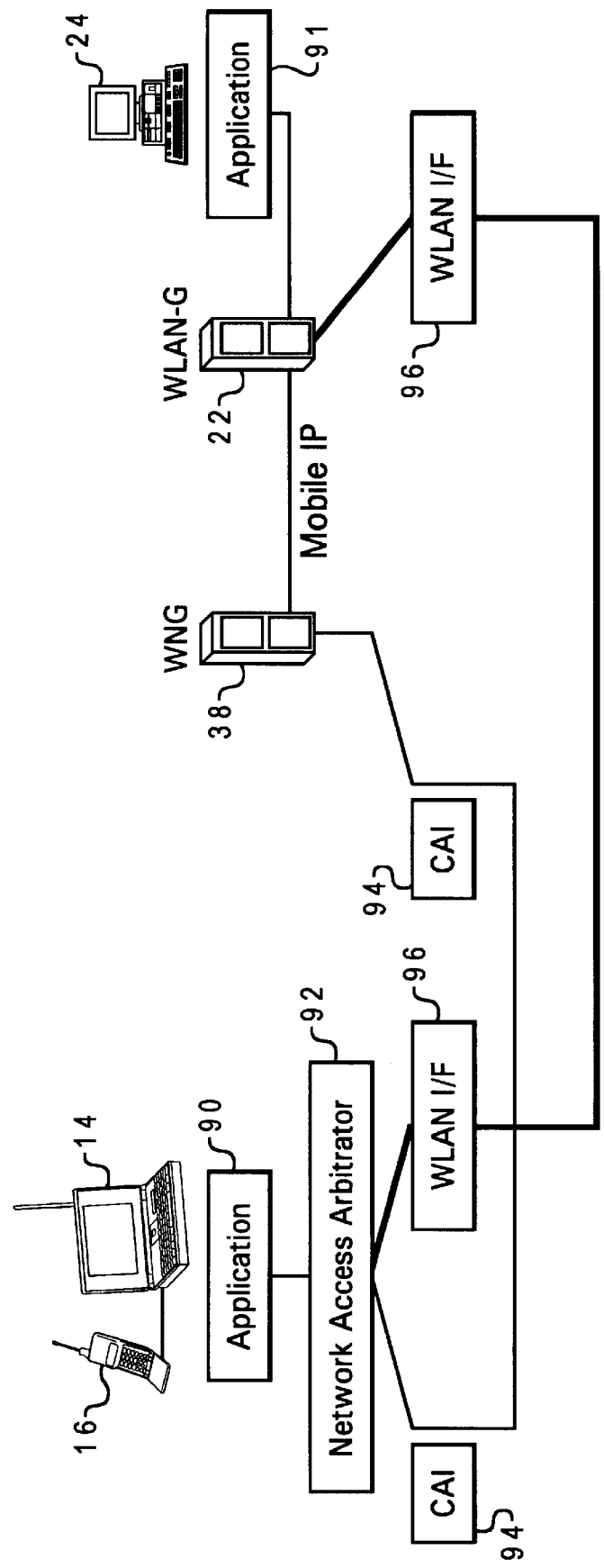
FIG. 3 is a data flow diagram illustrating the interrelationship of the software utilized to implement the present invention in a preferred embodiment.

With reference now to FIG. 3, there is depicted a data flow diagram illustrating the relationship between the various software components utilized to facilitate data communication in accordance with the present invention. As illustrated, a first application 90 is executed by mobile terminal 14, and a second application 91 is executed by fixed terminal 24 of WLAN 12. Applications 90 and 91, which may be the same or different applications, are compatible in the sense that data can be shared between applications 90 and 91 via program-to-program transfer. In addition to application 90, mobile terminal 14 executes communication software including network access arbitrator 92, cellular access interface (CAI) 94 and WLAN interface 96. As discussed further below, network access arbitrator 92 routes datagrams output by application 90 to either CAI 94 or WLAN interface 96 and transfers datagrams received from CAI 94 and WLAN interface 96 to application 90. CAI 94 and WLAN interface 96 form the lowest level of the communication software and provide software support within mobile terminal 14 for data transfer with CAI 94 executed by WNG 38 and WLAN interface 96 executed by WLAN-G 22, respectively.

Figure 4:
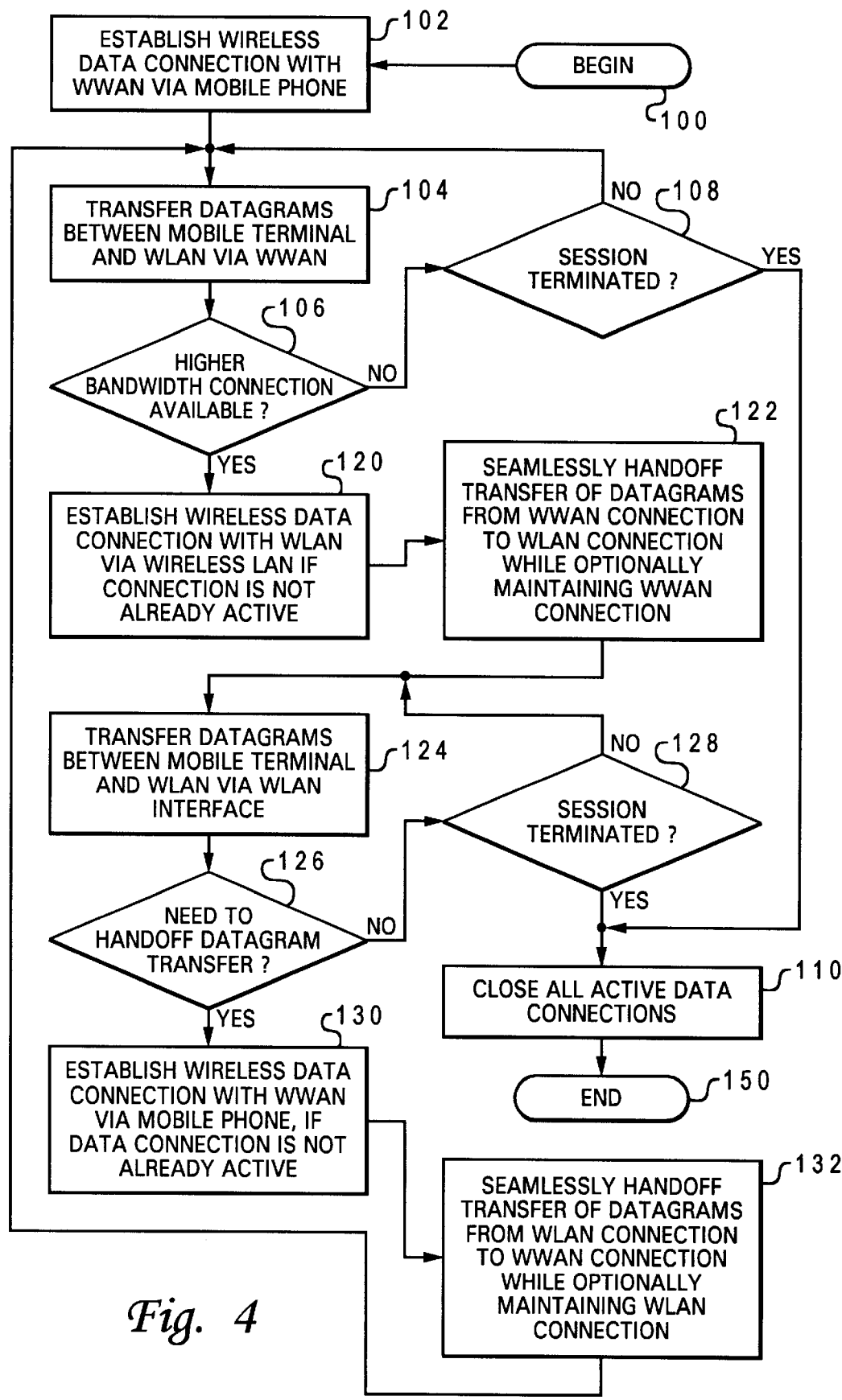
FIG. 4 is a high level logical flowchart depicting a method of wireless data communication in which a data communication session is seamlessly handed off between wireless data communication networks.

Referring now to FIG. 4, there is depicted a high level logical flowchart of a method of wireless data communication in which a data communication session is seamlessly handed off between wireless data communication networks. For illustrative purposes, the process will be described with respect to an exemplary processing scenario in which the service area of WWAN 10 includes a business premises or campus housing WLAN 12 and in which a user of mobile terminal 14 travels from a location distant from WLAN 12 into the service area of WLAN 12 and then returns to the remote location.

As illustrated, the process begins at block 100 and thereafter proceeds to block 102, which illustrates mobile terminal 14 first establishing a wireless data connection with WWAN 10 via mobile phone 16 while located outside the service area of WLAN 12. The wireless data connection to WWAN 10 can be established, for example, as part of the power-on procedures of mobile terminal 14 or in response to a user input while interacting with application 90. In any event, a signal is transmitted via I/O adapter 78 to mobile phone 16, which responds to the signal by establishing the wireless data connection utilizing a conventional technique, for example, by requesting a connection from the MSC within NSS 32 using a message transmitted to base station 30 via a control channel. As indicated at block 104, datagrams may thereafter be transferred between application 90 executed by mobile terminal 14 and application 91 executed by a fixed terminal 24 within WLAN 12. As discussed above with respect to FIG. 3, at the higher layers of connectivity the outward-bound datagrams are passed from application 90 to network access arbitrator 92, which routes the datagrams to CAI 94. CAI 94 transmits the datagrams via I/O adapter 78, mobile phone 16, base station 30, NSS 32 and IWF 36 to the CAI 94 executed by WNG 38. The CAI 94 executed by WNG 38 in turn transmits the datagrams to WLAN-G 22 utilizing the mobile IP protocol. In response to receipt of datagrams by WLAN-G 22, WLAN-G 22 converts the datagrams to the appropriate protocol for WLAN 12 and forwards them to the fixed terminal 24 executing application 91. Datagrams transmitted from application 91 to application 90 follows the reverse data path.

As depicted at block 106, a determination can be made at any time following block 102 whether or not a higher bandwidth data connection is available. The determination illustrated at block 106 can be made by WLAN interface 96, for example, which may periodically poll to determine whether a connection can be obtained directly with WLAN 12 via wireless network adapter 20. This polling behavior may entail WLAN interface 96 periodically determining whether an "advertisement" message has been received by wireless LAN adapter 64 from wireless network adapter 20. Alternatively, and less preferably since mobile terminal 14 is typically powered by a limited life battery, the determination illustrated at block 106 can represent WLAN interface 96 detecting whether an "advertisement" message transmitted by wireless LAN adapter 64 has received a response from WLAN interface 96. If a determination is made at block 106 that no higher bandwidth data connection is available, the process passes to block 108, which illustrates a determination of whether or not the session has been terminated by the user or by application 90. If not, the process simply returns to block 104, which has been described. If, however, a determination is made at block 108 that the session has been terminated, the process passes to block 110, which illustrates network access arbitrator 92 terminating all active wireless data connections. The process then ends at block 150.

Returning to block 106, in response to a determination that a higher bandwidth data connection (i.e., a direct connection to WLAN via wireless network adapter 20) is available, for example, due to mobile terminal 14 being moved into the service area of WLAN 12, the process proceeds to block 120. Block 120 depicts mobile terminal 14 establishing a second wireless data connection by logging on to WLAN 12 via wireless network adapter 20. To logon to WLAN 12, mobile terminal 14 performs the conventional registration procedures dictated by the network and followed by fixed terminals 24, except that logon information is conveyed between mobile terminal 14 and wireless LAN adapter 64 by wireless communication. Thus, following block 120, the user has concurrent wireless data connections with both WWAN 10 and WLAN 12. Then, as depicted at block 122, network access arbitrator 92 causes the transfer of datagrams to be seamlessly handed off from the wireless connection with WWAN 10 to the wireless connection with WLAN 12 while maintaining the session between applications 90 and 91. Thus, following block 122, datagrams are routed between application 90 and application 91 utilizing the higher bandwidth data path between WLAN interfaces 96 rather than between CAIs 94, as shown at block 124.

Next, as illustrated at block 126, network access arbitrator 92 determines whether or not the transfer of datagrams should be handed off to the connection with WWAN 10, for example, in response to mobile terminal 14 being moved out of range of WLAN 12 due to the user leaving the business premises housing WLAN 12. The determination made at block 126 can be based on one or more factors, including the number of transmission errors detected by WLAN interface 96 and the received signal strength (RSS) of signals received by wireless LAN adapter 64. In response to a determination at block 126 that the transfer of datagrams should not be handed off, the process passes to block 128, which illustrates a determination of whether or not the user or application 90 has terminated the session with application 91. If so, network access arbitrator 94 closes all active wireless data connections at block 110, and the process ends at block 150. If, on the other hand, a determination is made at block 128 that the session has not been terminated, the process returns to block 124, which has been described.

Returning to block 126, in response to a determination by network access arbitrator 92 that the transfer of datagrams should be handed off, the process passes to block 130. Block 130 illustrates network access arbitrator 92 causing a wireless data connection to be reestablished with WWAN 10 in the manner described above with respect to block 102, if such a connection is not already active. Thereafter, network access arbitrator 92 reroutes the flow of datagrams from WLAN interface 96 to CAI 94. As indicated at block 132, the data wireless connection with WLAN 12 can thereafter optionally be maintained, if possible, until such time as the condition that prompted the handoff is no longer present and datagram transfer can again be handed off to the high bandwidth connection with WLAN 12. The process illustrated in FIG. 4 then returns to block 104, which has been described.

As has been described, the present invention provides an improved method and system for wireless data communication in which the transfer of datagrams may be seamlessly handed off between multiple concurrent wireless data connections while maintaining an application-level session. While the invention has been particularly shown and described with reference to a preferred embodiment, it will be understood by those skilled in the art that various changes in form and detail may be made therein without departing from the spirit and scope of the invention.

What is claimed is:

1. A mobile computer terminal, comprising:

data processing resources for executing software;

a first wireless interface directly coupled to the data processing resources that interfaces the mobile computer terminal to a cellular wireless communication network;

a second wireless interface directly coupled to the data processing resources that interfaces the mobile computer terminal to a wireless local area network;

a network access arbitrator that routes data communicated between said software executed by said data processing resources and the cellular wireless communication network via the first wireless interface; and wherein the network access arbitrator seamlessly hand-off said data from said cellular wireless communication network via the first wireless interface to the wireless local area network via the second wireless interface in response to said mobile computer terminal having a higher bandwidth connection to the wireless local area network than to the cellular wireless network.

2. The mobile computer terminal of claim 1, wherein:

the network access arbitrator interfaces with the first wireless interface to setup a communication with the cellular wireless communication network;

the network access arbitrator interfaces with the second wireless interface to setup a communication with the wireless local area network; and wherein the setup of the communication with the cellular wireless communication network is distinct and separate from the setup of the communication with the wireless local area network.

3. The mobile computer terminal of claim 1, and further comprising data storage that stores said software.

4. The mobile computer terminal of claim 1, wherein the first wireless interface includes a mobile telephone in data communication with the cellular wireless communication network.

5. The mobile computer terminal of claim 1, wherein:

the first wireless interface comprises a cellular telephone coupled to an input/output adapter of the mobile computer terminal; and the second wireless interface comprises a wireless network adapter coupled to a local bus of the mobile computer terminal.

6. A method of wireless data communication within a mobile computer terminal, said method comprising:

establishing a wireless connection with a cellular wireless communication network via a first wireless interface directly coupled to the mobile computer terminal;

establishing a wireless connection with a wireless local area network via a second wireless interface directly coupled to the mobile computer terminal, the wireless connection with the local area network enabled concurrently with the wireless connection with the cellular wireless communication network;

routing data between the mobile computer system and the cellular wireless communication network via the first wireless interface; and seamlessly handing-off data from the cellular wireless communication network via the first wireless interface to the wireless local area network via the second wireless interface in response to said mobile computer terminal having a higher bandwidth connection to the wireless local area network than to the cellular wireless network.

7. The method of claim 6, wherein the setup of the wireless connection with the cellular wireless communication network is distinct and separate from the setup of the wireless connection with the wireless local area network.

8. The method of claim 6, and further comprising executing software within said mobile computer terminal that communicates with both the cellular wireless communication network and the wireless local area network.

9. The method of claim 6, and further comprising communicating said data between said mobile computer terminal and the cellular wireless communication network utilizing a mobile telephone connected to said mobile computer terminal as the first wireless interface.

10. The method of claim 6, and further comprising communicating said data between said mobile computer terminal and the wireless local area network utilizing a wireless network adapter as the second wireless interface.

11. A computer usable medium that stores a plurality of software instructions for execution by a mobile computer terminal to support seamless roaming of a mobile computer terminal between wireless communication networks, said computer usable medium comprising:

a plurality of instructions that are executable by the mobile computer terminal to support simultaneous wireless connections between the mobile computer terminal and a cellular wireless communication network via a first wireless interface directly coupled to the mobile computer terminal and a wireless local area network via a second wireless interface directly coupled to the mobile computer terminal;

a plurality of instructions that are executable by a network access arbitrator of the mobile computer terminal to cause the network access arbitrator to route data communicated between the mobile computer terminal and the cellular wireless communication network and the wireless local area network, wherein said network access arbitrator routes said data to the cellular wireless communication network via the first wireless interface; and wherein the network access arbitrator seamlessly hand-off said data from said cellular wireless communication network via the first wireless interface to the wireless local area network via the second wireless interface in response to said mobile computer terminal having a higher bandwidth connection to the wireless local area network than to the cellular wireless network.

* * * * *